United States Patent [19]

Butler, III et al.

[11] Patent Number: 4,942,326

[45] Date of Patent: Jul. 17, 1990

[54] BIASED SECUREMENT SYSTEM FOR END WINDING CONDUCTOR

[75] Inventors: John M. Butler, III, Orlando; Hector O. Ponce, Pensacola, both of Fla.

[73] Assignee: Westinghouse Electric Corp., Pittsburgh, Pa.

[21] Appl. No.: 340,196

[22] Filed: Apr. 19, 1989

[51] Int. Cl.⁵ .......................... H02K 3/46; H02K 3/00
[52] U.S. Cl. ...................................... 310/260; 310/194
[58] Field of Search ................. 310/91, 194, 214, 260, 310/270

[56] References Cited

U.S. PATENT DOCUMENTS

| | | | |
|---|---|---|---|
| 3,739,212 | 6/1973 | Koelbel et al. | 310/194 |
| 3,949,256 | 4/1976 | Cooper et al. | 310/260 |
| 3,949,257 | 4/1976 | Cooper et al. | 310/260 |
| 4,068,142 | 1/1978 | Gillet et al. | 310/214 |
| 4,126,799 | 11/1978 | Iogansen et al. | 310/260 |
| 4,238,339 | 12/1980 | Khutoretsky et al. | 310/260 |
| 4,345,175 | 8/1982 | Jones | 310/214 |
| 4,415,825 | 11/1983 | Dailey et al. | 310/260 |
| 4,800,314 | 1/1989 | Ward et al. | 310/260 |

FOREIGN PATENT DOCUMENTS 57-78342  5/1982  Japan.

Primary Examiner—Peter S. Wong
Assistant Examiner—C. E. LaBalle
Attorney, Agent, or Firm—M. G. Panian

[57] ABSTRACT

A biased securement system for end winding conductors of a turbine generator stator has a support ring and a biased wedge system that compresses the end windings in both a radial and circumferential direction. The biased wedge system includes a pair of spacer blocks with confronting angular surfaces and a triangular shaped wedge that is biased towards the support ring by use of a belleville spring washer.

11 Claims, 3 Drawing Sheets

BIASED SECUREMENT SYSTEM FOR END WINDING CONDUCTOR

FIELD OF THE INVENTION

The invention relates to a biased securement system for end winding conductors of a turbine generator stator, which securement system provides support for the end winding conductors in both a radial and circumferential direction.

BACKGROUND OF THE INVENTION

The end winding conductors of large turbine generators are conventionally braced or secured by the use of conformable pads or blocks located between the conductors and various support rings that surround the conductors. These pads are usually in the form of a resin-impregnated, resilient material in the form of felt pads or hose-like members.

As discussed in U.S. Pat. No. 3,949,257, which is assigned to the assignee of the present invention, and incorporated by reference herein, the use of pads requires that a supply of different sized pads be provided so as to provide the specific thickness needed. The pads must be tightly fitted so as to keep the conductors tight over the long periods of normal operation. In the improvement described in U.S. Pat. No. 3,949,257, support rings are provided at the inside and outside surfaces of the end winding conductors, with additional support rings disposed between the conductors. Reinforced hoses are disposed between the rings and conductors and extend around the circumference of the rings, which hoses are pressure filled with an epoxy resin that hardens to maintain pressure between the conductors and support rings and provide tight radial support for the end winding conductors.

Such stator coil end blocking is required to prevent excess vibration of the end winding conductors and any cracking or abrasion of components. To do this over the lifetime of the generator with minimum maintenance, the blocking system design should take into account thermal expansion and creep of materials. Many designs incorporate some means of tightening coils in the radial direction using bolts, bands or spring loaded wedges. In designs where a large support ring is used as the backbone to which coils are tied, coils must move very slightly outwardly against the support ring and radial tightness is assured. There still remains, however, a tendency for the end winding conductors to loosen in the circumferential direction about the support ring.

It has previously been proposed to incorporate wedges between all coil ends without any biasing means provided with the wedging. Also, another design uses belleville loaded wedges oriented in a fashion to apply load radially inwardly on the outer diameter of the "basket" formed by the end winding conductors. This method, while serving to provide both a radial load and circumferential load by compressing the end winding conductors from the outside diameter and "arch binding" the winding, precludes the effective use of the simple and more rugged single large support ring.

It is an object of the present invention to provide a securement system for end winding conductors that uses a large support ring around the periphery of the windings and which provides compression of the end winding conductors in both a radial and a circumferential direction.

SUMMARY OF THE INVENTION

A biased securement system for the end winding conductors of a turbine has a support ring disposed about the periphery of a plurality of such windings and a biased wedge system which compresses the end windings in both a radial and circumferential direction. The biased wedge system includes a pair of confronting spacer blocks and a wedge disposed therebetween, with a biasing means such as a belleville spring washer biasing the wedge towards the support ring.

In one embodiment, the spacer blocks are of L-shaped design with a hollow formed between vertical and horizontal sections thereof in which an end winding conductor may seat, while another embodiment uses rectangular shaped spacer blocks. The spacer blocks have confronting angular surfaces, that converge in the direction of the support ring, which are contacted by a triangular shaped wedge. The wedge is secured to the support ring by use of a bolt passing therethrough that is threadedly engaged in a bore in the support ring, while a spring such as a belleville spring washer is disposed between the wedge and the head of the bolt to bias the same and the end windings.

DESCRIPTION OF THE DRAWINGS

The invention will become more readily apparent from the following description of preferred embodiments thereof shown, by way of example only, in the accompanying drawings, wherein.

DETAILED DESCRIPTION

Figure 1:
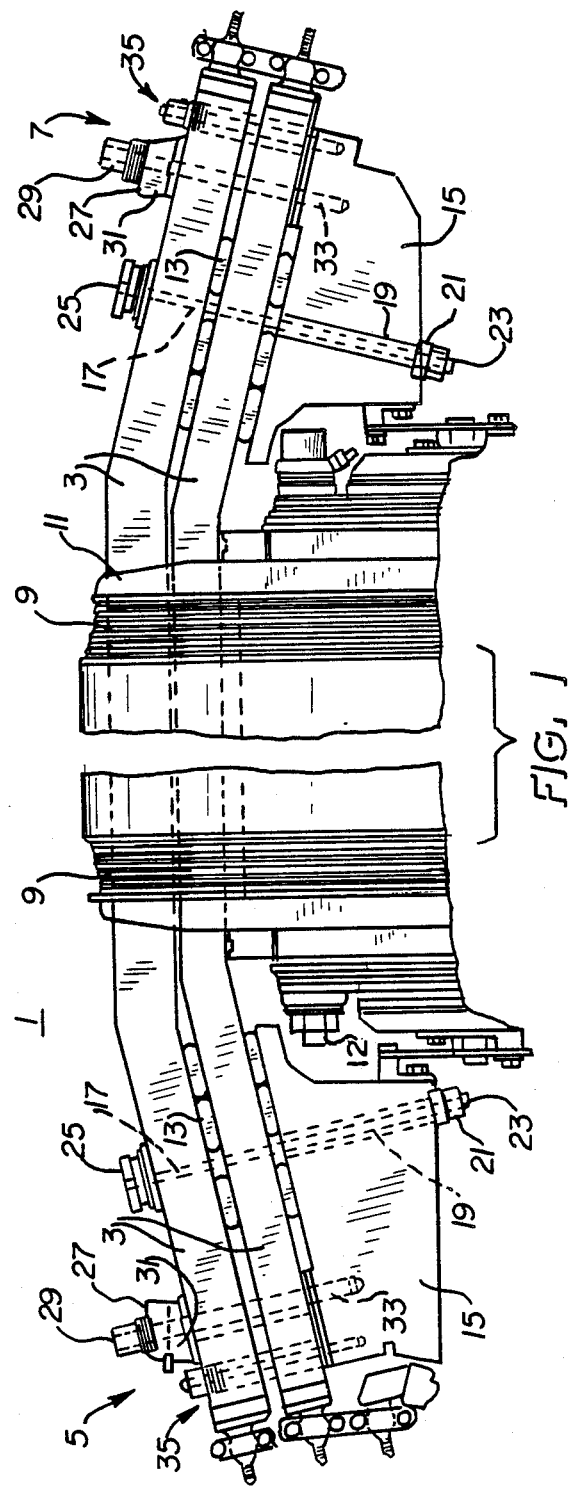
FIG. 1 is a partial view of a turbine generator, showing both the exciter end and turbine end, using the biased securement system of the present invention.

Referring now to FIG. 1, a turbine generator 1 is illustrated showing end winding conductors 3 at both the exciter end 5 and the turbine end 7 of the generator. The turbine generator 1 includes a stator iron core 9 held together between core support plates 11 by bolts 12. Spacers 13 are provided between end winding conductors 3 and a support cone or ring 15 surrounds the outer periphery of the end winding conductors 3. Radial studs 17 pass between the end winding conductors 3 and through an aperture 19 in the support ring 15, with a bolt 21 securing the studs at the threaded end 23 opposite the head 25 of the studs 17. A supplemental support ring 27, on the opposite side of the end winding conductors 3 from the support ring 15 is held in place against the end winding conductors 3 by a bolt 29 passing through an aperture 31 therein, which bolt is threadedly engaged in a threaded bore 33 in support ring 15.

Figure 2:
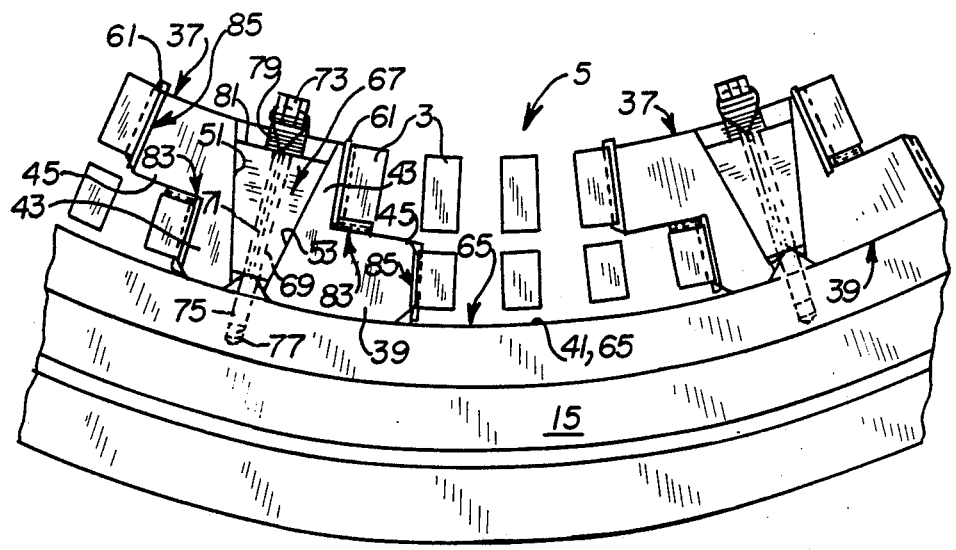
FIG. 2 is a partial view illustrating the biased securement system securing end winding conductors at the exciter end of the turbine generator of FIG. 1.
Figure 3:
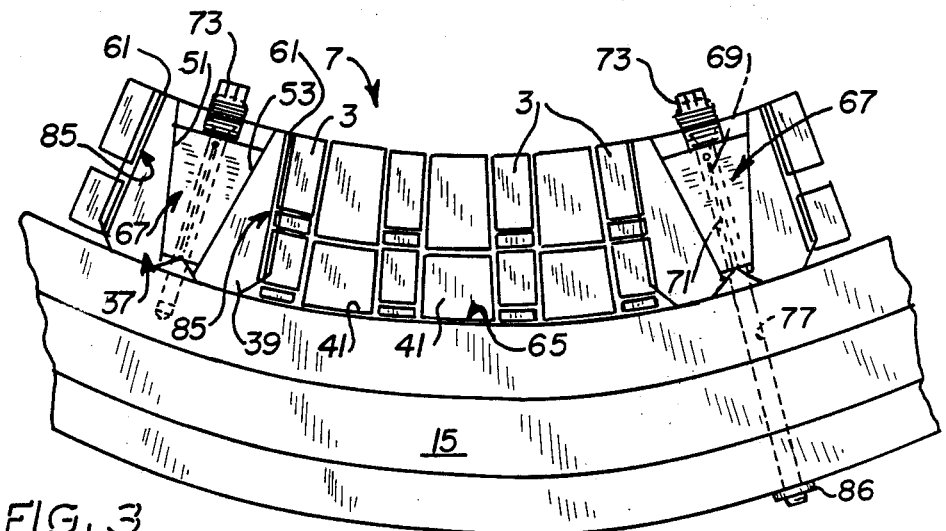
FIG. 3 is a partial view illustrating the biased securement system securing end winding conductors at the turbine end of the turbine generator of FIG. 1.
Figure 4:
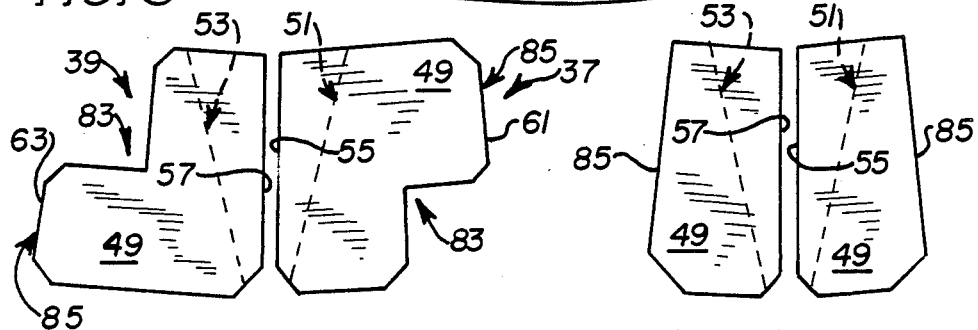
FIG. 4 is a view of the back side of the spacer blocks shown in FIG. 2.
Figure 5:
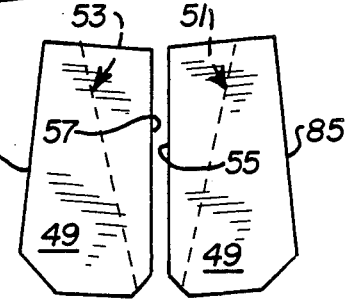
FIG. 5 is a view of the back side of the spacer blocks shown in FIG. 3.

The biased wedge system 35 of the present invention is shown at the outer axial end of the support ring 15 and is better illustrated in FIG. 2 at the exciter end 5 of the turbine generator 1, and in FIG. 3 at the turbine end 7 of the turbine generator 1.

Figure 6:
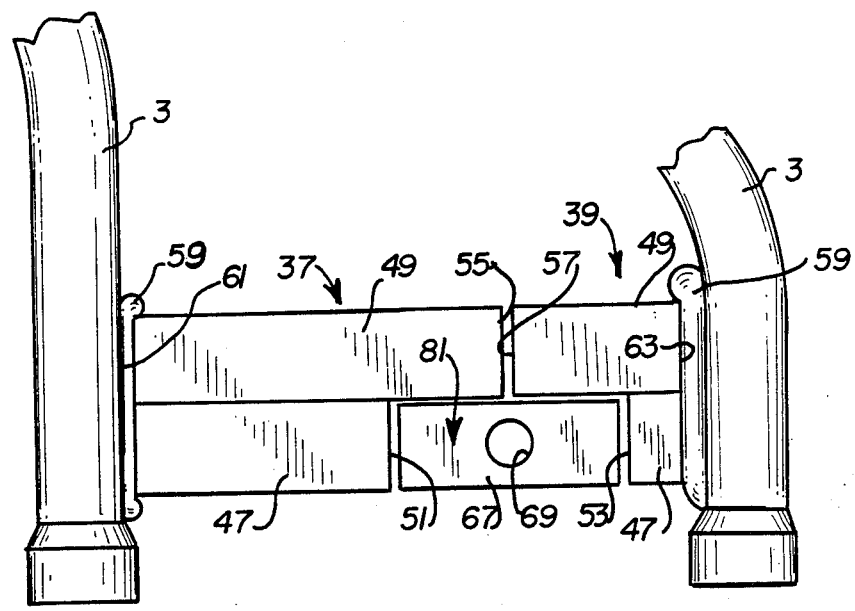
FIG. 6 is a top plan view of the back side of a spacer block, as illustrated in FIG. 2 with the bolt and belleville spring removed.

As illustrated in FIG. 2, in a first embodiment of the biased wedge system 35 for use at the exciter end 5 of a generator, a pair of spacer blocks 37 and 39 are provided which are flush with the inner surface 41 of the support ring 15 and disposed between the end winding conductors 3 at the phase splits of the conductors. The blocks 37 and 39 are illustrated in an L-shaped design, with a vertical portion 43 and horizontal leg portion 45. The blocks 37 and 39 have, as illustrated in FIG. 6, an axial outer section 47 and axial inner section 49, as viewed along the axis of the turbine, the two sections 47 and 49 either formed as an integral unit or secured together. The blocks 37 and 39 each have a confronting angular surface 51 and 53 which converge in the direction of the support ring 15 on one section, illustrated as the outer section 47, while the inner section 49 has confronting spaced faces 55 and 57. Conforming spacers 59, such as resin impregnated Dacron felt pads, are positioned between the radial outer end 61 of block 37 and adjacent end winding conductor 3 and between the radial outer end 63 of block 39 and adjacent end winding conductor 3. A thin flexible shear layer 65 is provided between the biased wedge system and the support ring 15, on the inner surface 41 of the support ring 15, as shown in FIGS. 2 and 3.

A triangular shaped wedge 67 is provided having a passageway 69 therethrough which is adapted to fit between and slidably engage the angular faces 51 and 53 on blocks 37 and 39. A bolt 71 has a head 73 and is of a sufficient length such that the opposite threaded end 75 is threadedly engaged in a threaded bore 77 formed in the support ring 15. Belleville spring washers 79 are disposed between the head 73 of bolt 71 and the upper surface 81 of the triangular shaped wedge 67. As a lock, an epoxy soaked glass cord may be wrapped around the bolt head and pin in the wedge 67.

As illustrated in FIG. 2, at the exciter end 5 of the generator 1, an end winding conductor 3 is seated in a hollow 83 of the L-shaped blocks 37, 39, while the outermost radial end 85 of the L-shaped blocks are in contact with a radially spaced adjacent end winding conductor 3. This embodiment of the spacer blocks 37, 39 is thus usable where circumferentially offset end winding conductors are present.

In operation, the wedges 67, which with the blocks are located at the phase splits, are inserted into the spacing between the confronting angular surfaces 51 and 53, and the bolt 71, preferably of fiberglass, is inserted through belleville washers 79 and the passageway 69 and threadedly engaged in the threaded bore 77 in support ring 15. Upon tightening of the bolt 71, the end winding conductors 3 are compressed in both a radial and circumferential direction. When the machine operates, the end winding conductors 3 may tighten further against the support ring 15 because the free thermal expansion of the conductor is larger than that of the support ring 15. In service, some creep of all materials can be expected, tending to reduce the wedge load. With sufficient relaxation, the belleville springs 79 will act to move the triangular shaped wedge 67 to maintain tightness. Upon cooldown, a further tendency to reduce load may occur due to a difference in thermal contraction and further belleville spring 79 followup may occur. With knowledge of the creep properties of the materials being compressed, wedges 67 and belleville springs 79 are sized for appropriate long term tightness. The present construction has the added advantage that followup capability can be easily and completely restored during maintenance, if ever necessary, by tightening the bolt 71. To allow for slight circumferential movements of the end winding conductors that may occur under the wedging action, the thin flexible shear layer 41 is provided between the end winding conductors 3 and the support ring 15. The layer 41, being thin, is stiff in the radial direction while allowing harmless permanent shear deformation in the circumferential direction without breaking epoxy bonds. Preferably, the bolts 71, belleville washers 79 and spacer blocks 37 and 39 are all made from epoxy and glass composites.

In the embodiment illustrated in FIG. 3, where the biased wedge system 35 is used at the turbine end 7 of a generator, the pair of spacer blocks 37 and 39 are provided in a substantially trapezoidal shape, with the outermost radial straight end 85 thereof contacting a pair of parallel spaced end winding conductors 3. Also, an alternative means of securing the bolt 71 to the support ring 15 is illustrated, wherein a bore 77, which may be unthreaded, extends through the support ring 15 and the bolt 71 extends through both the wedge 67 and support ring 15 and is secured by a nut 86 against the support ring.

Figure 7:
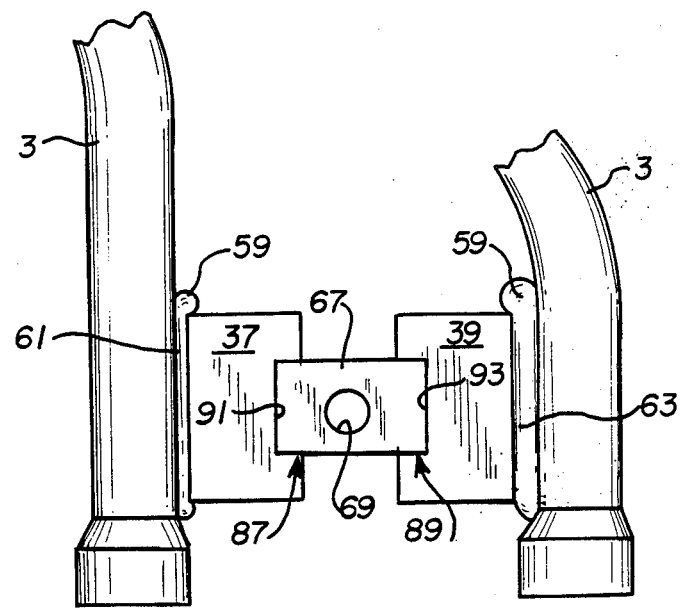
FIG. 7 is a top plan view of an alternative embodiment of a spacer block for use in the present biased securement system.

In an alternative embodiment of the biased wedge system illustrated in FIG. 7, the spacer blocks 37 and 39 are each formed as a single unit. Spacer block 37 is provided with a channel 87, while spacer block 39 is provided with a channel 89, the channels 87 and 89 confronting each other when the spacer blocks are in assembled portion. The channels 87 and 89 have angular faces 91 and 93 respectively, defined by said channels, which converge in the direction of the support ring 15. The triangular shaped wedge 67 is slidable in the channels 87 and 89 and slidably engages the angular faces 91 and 93 on blocks 37 and 39, with a bolt passed through passageway 69 in the triangular shaped wedge 67, which, with a belleville spring washer, and engaged in a tapped bore in the support ring 15, will provide the desired wedging action.

What is claimed is:

1. A biased securement system for end winding components of an electromechanical apparatus comprising:
   a support ring disposed about a plurality of peripherally spaced said end windings;
   a biased wedge system located between said spaced end windings to compress said end windings in both a radial and circumferential direction;
   said biased wedge system including a pair of confronting spacer blocks flush with an inner surface of said support ring; and
   a wedge disposed between the pair of spacer blocks to bias the same in a circumferential direction, said spacer blocks having confronting angular surfaces which converge in the direction of said support ring and said wedge is a triangular-shaped wedge slideably engageable with said confronting angular surfaces, and a biasing means to bias said wedge towards said support ring.

2. The biased securement system as defined in claim 1 wherein said wedge has a passageway therethrough, said support ring has a threaded bore therein, and a bolt extends through said passageway and is threadably engaged in said threaded bore.

3. The biased securement system as defined in claim 2 wherein said bolt has a head thereon and said biasing means comprises a belleville spring washer disposed between said head and said wedge.

4. The biased securement system as defined in claim 3 wherein said spacer blocks have a hollow in which an end winding conductor seats.

5. A biased securement system for end winding conductors of an electromechanical apparatus comprising:
a support ring disposed about a plurality of peripherally spaced said end windings;
a biased wedge system located between said spaced end windings to compress said end windings in both a radial and circumferential direction;
said biased wedge system including a pair of confronting spacer blocks, a wedge and a biasing means;
said spacer blocks having confronting angular surfaces which converge in the direction of said support ring;
said wedge being a triangular shaped wedge, slidably engageable with said confronting angular surfaces, having a passageway therethrough, with said support ring having a threaded bore therein, and a bolt extends through said passageway and is threadedly engaged in said threaded bore, said bolt having a head spaced from the upper surface of said wedge; and
said biasing means being a belleville spring washer disposed between the head of said bolt and said wedge.

6. The biased securement system as defined in claim 5 wherein said spacer blocks have a hollow in which an end winding conductor seats.

7. The biased securement system as defined in claim 5 wherein said spacer blocks are trapezoidal in shape.

8. The biased securement system as defined in claim 5 wherein each said spacer block has a channel therein, with said channels confronting each other, and said angular surfaces are defined by said channels.

9. A biased securement system for end winding conductors of an electromechanical apparatus comprising:
a support ring disposed about a plurality of peripherally spaced said end windings, said support ring having an inner surface and a threaded bore; and
a biased wedge system located between said spaced end windings to compress said end windings in both a radial and circumferential direction;
said biased wedge system including:
a pair of confronting spacer blocks trapezoidal in shape and flush with said inner surface of said support ring, said spacer blocks having confronting angular surfaces which converge in the direction of said support ring;
a triangular shaped wedge slideably engageable with said confronting angular surfaces and disposed between said pair of spacer blocks to bias the same in a circumferential direction, said wedge having a passageway therethrough;
a bolt extending through said passageway and threadedly engaged in said threaded bore and having a head; and
a belleville spring washer disposed between said head and said wedge to bias said wedge towards said support ring.

10. A biased securement system for end winding conductors of an electromechanical apparatus comprising:
a support ring disposed about a plurality of peripherally spaced said end windings, said support ring having an inner surface and a threaded bore; and
a biased wedge system located between said spaced end windings to compress said end windings in both a radial and circumferential direction;
said biased wedge system including:
a pair of confronting spacer blocks flush with said inner surface of said support ring, each spacer block having a channel therein with said channels fronting each other, said channels defining confronting angular surfaces which converge in the direction of said support ring;
a triangular shaped wedge slideably engageable with said confronting angular channels and disposed between said pair of spacer blocks to bias the same in a circumferential direction, said wedge having a passageway therethrough;
a bolt extending through said passageway and threadedly engaged in said threaded bore and having a head; and
a belleville spring washer disposed between said head and said wedge to bias said wedge towards said support ring.

11. A biased securement system for end winding conductors of an electromechanical apparatus comprising:
a support ring disposed about a plurality of peripherally spaced end windings, said support ring having an inner surface and a bore therethrough; and
a biased wedge system located between said spaced end windings to compress said end windings in both a radial and circumferential direction;
said biased wedge system including:
a pair of confronting spacer blocks flush with said inner surface of said support ring, said spacer blocks having confronting angular surfaces which converge in the direction of said support ring;
a triangular shaped wedge slideably engageable with said confronting angular surfaces and disposed between the pair of spacer blocks to bias the same in a circumferential direction, said wedge having a passageway therethrough;
a bolt extending through said passageway and said bore said bolt having a head and secured with a nut against said support ring; and
a belleville spring washer disposed between said head and said wedge to bias said wedge towards said support ring.

* * * * *